(12) United States Patent
Honma et al.

(10) Patent No.: US 7,309,971 B2
(45) Date of Patent: Dec. 18, 2007

(54) OPENING AND CLOSING BODY CONTROL DEVICE

(75) Inventors: Chiaki Honma, Obu (JP); Shintaro Suzuki, Kasugai (JP); Tomoaki Imaizumi, Aichi-ken (JP); Eiji Itami, Chiryu (JP)

(73) Assignee: Aisin Seiki Kabushiki Kaisha, Aichi-ken (JP)

( * ) Notice: Subject to any disclaimer, the term of this patent is extended or adjusted under 35 U.S.C. 154(b) by 322 days.

(21) Appl. No.: 11/059,323

(22) Filed: Feb. 17, 2005

(65) Prior Publication Data

US 2005/0179409 A1    Aug. 18, 2005

(30) Foreign Application Priority Data

Feb. 18, 2004    (JP) .............................. 2004-041988

(51) Int. Cl.
*H02P 1/04* (2006.01)

(52) U.S. Cl. ....................... 318/466; 318/280; 318/283

(58) Field of Classification Search ................. 318/34, 318/69, 260, 266, 434, 466, 461, 280, 286; 49/360
See application file for complete search history.

(56) References Cited

U.S. PATENT DOCUMENTS

| 7,122,981 B2* | 10/2006 | Knab et al. ................. 318/283 |
| 7,170,244 B2* | 1/2007 | Choby ......................... 318/280 |
| 2006/0137250 A1* | 6/2006 | Imai et al. .................... 49/360 |
| 2006/0208678 A1* | 9/2006 | Choby ......................... 318/280 |

FOREIGN PATENT DOCUMENTS

JP        05-280253        10/1993

* cited by examiner

*Primary Examiner*—Paul Ip
(74) *Attorney, Agent, or Firm*—Sughrue Mion Pllc.

(57) ABSTRACT

An opening and closing body control device includes an actuation device for actuating an opening and closing body which operates relative to a body, a speed detection device for detecting moving speed of the opening and closing body, and a control device for driving the actuation device based on detected results from the speed detection device. The control device conducts anti-pinch transaction when an object is pinched between the opening and closing body and the body. The control device includes a speed difference calculation device for calculating speed difference between latest speed and speed at predetermined time earlier, a speed difference memory device for memorizing predetermined number of the speed differences, an accumulation device for calculating accumulation value by accumulating predetermined number of speed differences, and a pinch detection device for conducting anti-pinch transaction by comparing the accumulation value and reference value for occurrence of pinch.

6 Claims, 10 Drawing Sheets

OPENING AND CLOSING BODY CONTROL DEVICE

CROSS REFERENCE TO RELATED APPLICATIONS

This application is based on and claims priority under 35 U.S.C. §119 with respect to Japanese Patent Application No. 2004-041988 filed on Feb. 18, 2004, the entire content of which is incorporated herein by reference.

FIELD OF THE INVENTION

The present invention relates to an opening and closing body control device for an opening and closing body relative to an opening of a body. More particularly, the present invention pertains to an opening and closing body control device for preventing pinching an object between the body and the opening and closing body.

BACKGROUND

Known opening and closing body control devices for controlling opening and closing bodies, for example, includes a power window regulator for operating a vehicle door window (i.e., windowpane) up and down, a sunroof device for operating a window (i.e., sunroof) provided on the top of the vehicle in a longitudinal direction of the vehicle, and a power slide device for opening and closing a vehicle door (i.e., slide door) provided at lateral portion of the vehicle. Known opening and closing devices, for example, described in JPH5 (1993)-280253A, are further provided with pinch detection function for the purpose of ensuring safety.

A known opening and closing body control device described in JPH5 (1993)-280253A is applied to a power window regulator. The opening and closing body control device described in JPH5 (1993)-280253A actuates a windowpane serving as an opening and closing body by means of a motor, and an actuation state (e.g., actuation speed of the motor) is detected by a potentiometer. The opening and closing body control device judges a pinch during upward operation of the windowpane, when speed at rotational speed stabilized period during which rotation of the motor is stabilized at the opening and closing body control device is determined as a reference speed, and the rotational speed of the motor is declined by a predetermined value relative to the reference speed.

When the opening and closing body control device judges a pinch with a method shown in JPH5 (1993)-280253A, a reference speed is calculated by an average rotational speed, and a anti-pinch transaction is conducted when a rotational speed of a motor declines by equal to or greater than a predetermined speed relative to the reference speed. In other words, because speed of the opening and closing body is momentarily declined by equal to or greater than a predetermined value relative to the reference speed in case a hard object which does not have elasticity is pinched during closing operation of the opening and closing body, the known opening and closing body control device described in JPH5 (1993)-280253A enables to judge the occurrence of the incident of pinch in early stages after the incident of something being pinched until the detection thereof. However, in case of a soft object having elasticity is pinched during closing operation of the opening and closing body, moving speed of the opening and closing body does not momentarily decline nor exceed the predetermined value relative to the reference speed. In this case, after the incident of something being pinched until the detection thereof, pinch force by the incident of something being pinched is gradually increased, and the operational speed of the opening and closing body is gradually changed.

In case something soft is pinched during the operation of the opening and closing body, it is required to accurately detect the pinch without increasing the pinch force.

A need thus exists for an opening and closing body control device which accurately detects an incident of pinch without increasing pinch force when something is pinched during operation of the opening and closing device.

SUMMARY OF THE INVENTION

In light of the foregoing, the present invention provides an opening and closing body control device, which includes an actuation means for actuating an opening and closing body which opens and closes relative to an opening of a body, a speed detection means for detecting moving speed of the opening and closing body by the actuation means, and a control means for driving the actuation means based on detected results from the speed detection means. The control means conducts anti-pinch transaction for movement of the opening and closing body when an object is pinched between the opening and closing body and the body. The control means includes a speed difference calculation means for calculating speed difference between latest speed and speed at predetermined time earlier of the opening and closing body on the basis of the detected results from the speed detection means, a speed difference memory means for memorizing predetermined number of the speed differences, an accumulation means for calculating accumulation value by accumulating predetermined number of speed differences, and a pinch detection means for conducting anti-pinch transaction of the opening and closing body by comparing the accumulation value and reference value for occurrence of pinch.

According to another aspect of the present invention, an opening and closing body control device is programmed to calculate speed of an opening and closing body based on a pulse signal from a speed detection means, calculate speed differences between latest speed of the opening and closing body and speed of the opening and closing body predetermined edges before, calculate accumulation value by integrating predetermined number of the speed differences, set reference value for pinch detection in accordance with a position of the opening and closing body, compare the accumulation value and the reference value for the pinch detection, and detect occurrence of pinching when the accumulation value of the speed differences reaches the predetermined reference value.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

One embodiment of the present invention will be explained with reference to illustrations of drawings figures as follows.

Figure 1:
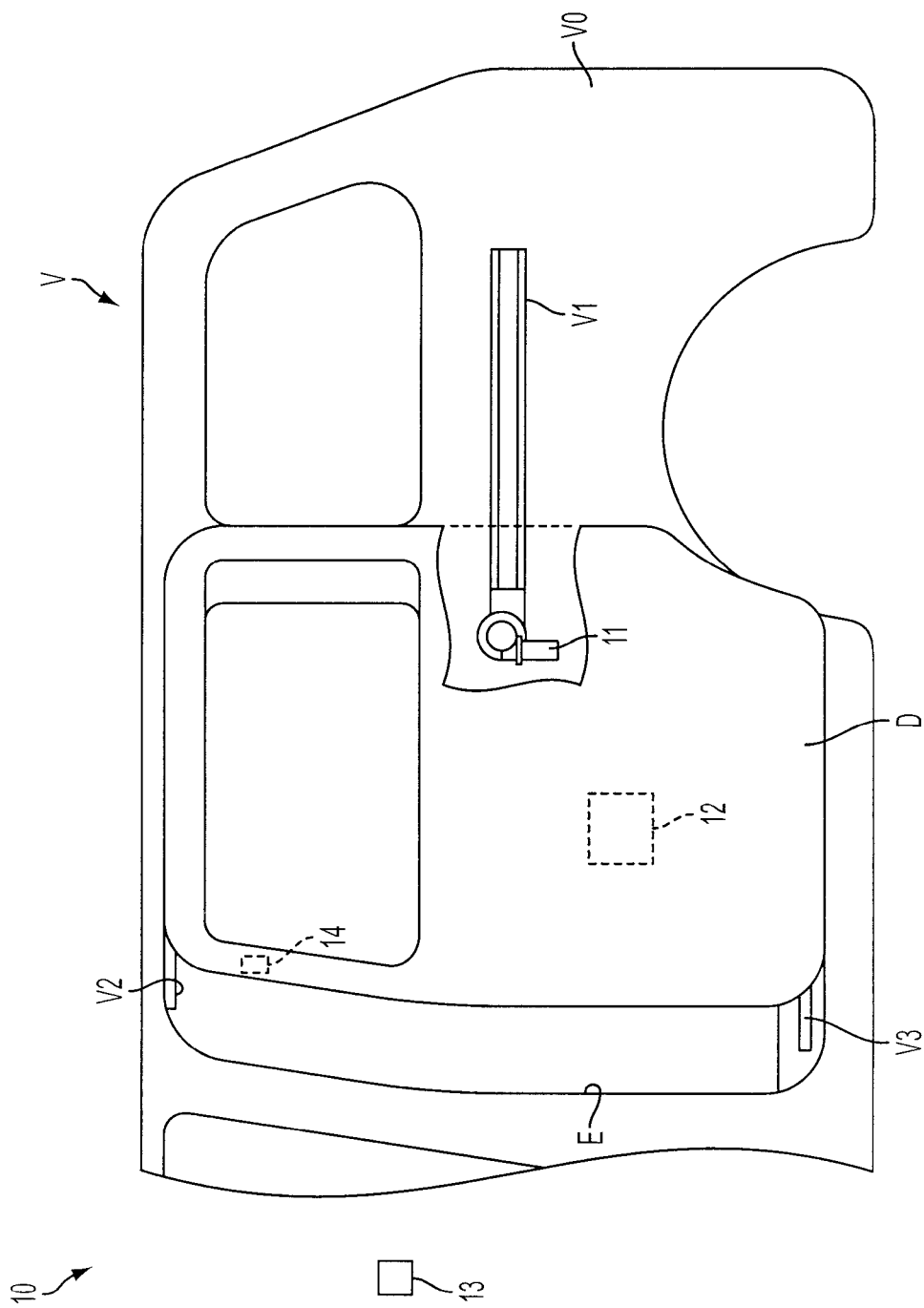
FIG. 1 is a view of an opening and closing body control device applied to a vehicle slide door control device according to an embodiment of the present invention.

As shown in FIG. 1, a power door opening and closing control device 10 serves as an opening and closing body for closing and opening an opening E (e.g., entrance) formed on lateral side of a body (e.g., vehicle) V for automatically opening and closing a slide door D. The power door opening and closing control device 10 includes a drive unit 11, an electronic control unit (hereinafter referred as ECU) 12 serving as a control means, an opening and closing operation switch 13, and a courtesy switch 14.

The slide door D is supported on a body V0 by means of a center guide rail V1 provided at rear lateral side of the body V0, an upper guide rail V2 provided at upper side of the opening E, and a lower guide rail V3 provided at lower side of the opening E to open and close in a longitudinal direction of the vehicle. The slide door D opens and closes within a range extending from a completely closed position in which the opening E is completely closed as far as a completely open position in which the opening E is opened to the maximum extent possible. When the slide door D opens from the completely closed position, the slide door D first moves in vehicle width direction at an initial opening operation, and thereafter linearly moves along the guide rails V1-V3 to the rear of the vehicle until it reaches the completely open position.

The drive unit 11 and the ECU 12 for controlling operation of the slide door D are accommodated in the slide door D (i.e., between an inner panel at chamber side and an outer panel at outside). The opening and closing operation switch 13 for commanding opening and closing of the slide door D is provided around driver's seat and is operated by a driver. The courtesy switch 14 is provided at front side of the slide door D for detecting that the slide door D is at the completely open position.

Figure 2:
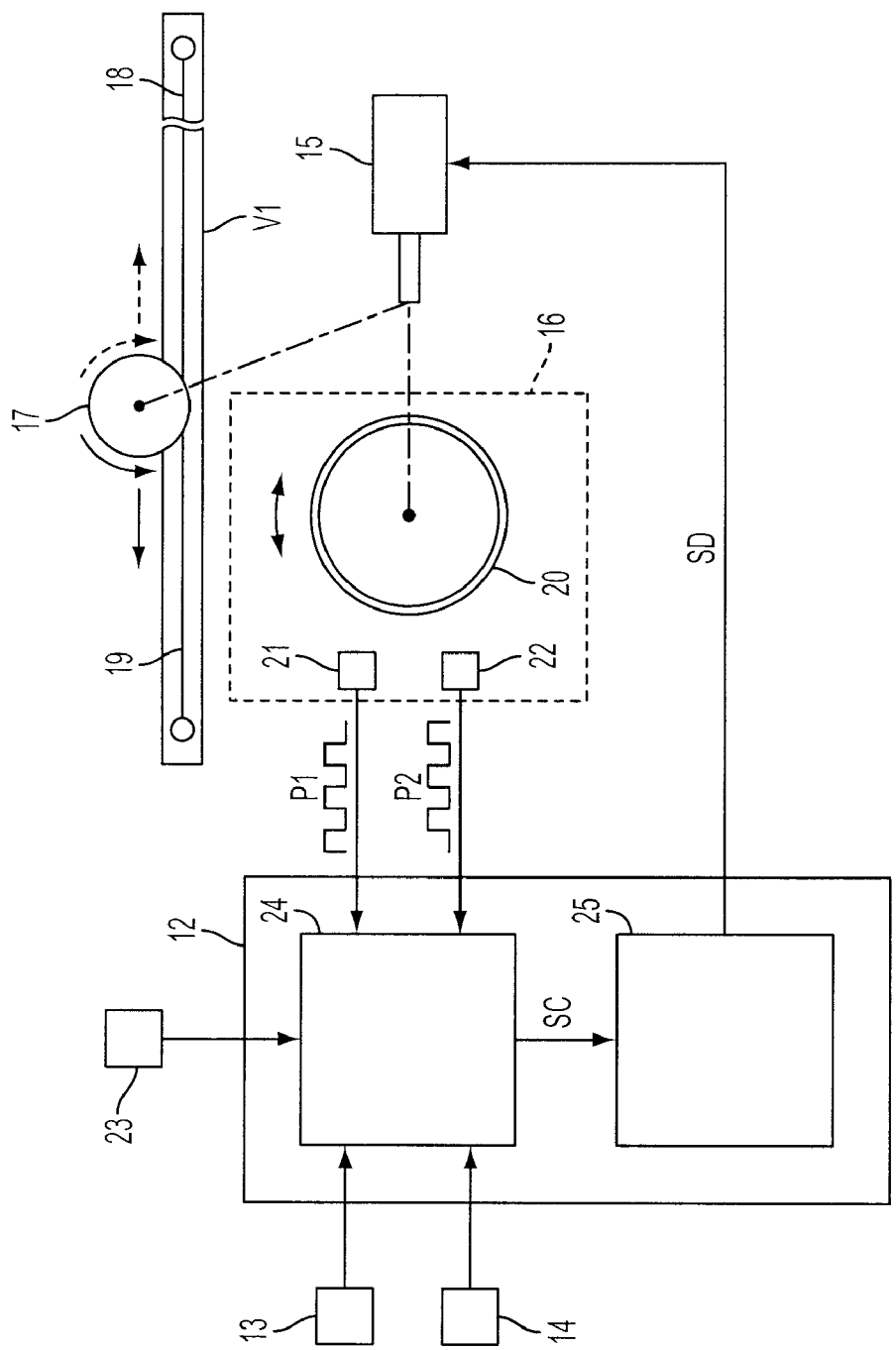
FIG. 2 is an explanatory view showing an electric structure of the opening and closing body control device according to the embodiment of the present invention.

As shown in FIG. 2, the drive unit 11 includes a motor 15 serving as an actuation means, a rotation position detection mechanism 16, a wire drum 17, a first wire 18, a second wire 19, and a deceleration mechanism. The motor 15 is powered by a battery installed in the vehicle, and rotates in normal and reverse directions to operate the slide door D. By means of the drive force from the motor 15, the wire drum 17 rotates in either normal or reverse directions via the deceleration mechanism. An end portion of the first wire 18 whose tip is fixed at a rear end (right side of FIG. 2) of the center guide rail V1 and an end portion of the second wire 19 whose tip is fixed at a front end of the center guide rail V1 (left side of FIG. 2) are wound around the wire drum 17. The first wire 18 and the second wire 19 are wound around the wire drum 17 so that the first wire 18 is wound up and the second wire 19 is unwound when the wire drum 17 rotates in a normal direction (i.e., direction shown with a dotted line of FIG. 2). The drive unit 11 drives the slide door D from the closed position to the open position when the motor 15 rotates in the normal direction and from the open position to the closed position when the motor 15 rotates in the reverse direction.

As shown in FIG. 2, the rotation position detection mechanism 16 includes an annular magnet 20 rotated by means of the motor 15, and a pair of Hall elements (e.g., Hall IC) 21, 22 (serving as a speed detection means) fixed at a housing of the rotation position detection mechanism 10 facing an external peripheral surface of the annular magnet 20. Magnetization region formed on an external surface of the annular magnet 20 is divided into N pole portions and S pole portions which are positioned in alternate order and are at equiangular in peripheral direction. Each Hall element 21, 22 detects each divided magnetization region in accordance with the rotation of the annular magnet 20, and outputs periodic pulse signals P1, P2 being synchronized with and proportional to the rotational speed of the annular magnet 20, that is, the rotational speed of the motor 15.

Electric structure of the power door opening and closing device 10 will be explained as follows.

The pulse signals P1, P2 outputted from the Hall elements 21, 22 respectively are arranged so that phases of the respective signals P1, P2 vary from each other by the equivalent of one-fourth of a pulse width (90 degrees of phase) in order to detect phase from the outputs of the pulse signals P1, P2. The pulse signals P1, P2 are inputted into the ECU 12. The ECU 12 compares the pulse signals P1, P2 therein, and detects the phase on the basis of the pulse signals P1, P2 to judge the rotational direction of the motor 15, that is, to judge whether the slide door D is operated in an opening direction or in closing direction. Speed of the slide door D (i.e., door speed) is calculated on the basis of a period between edges of rising edge and falling edge, which are inputted into the ECU 12 of the pulse signal P1 (or pulse signal P2). In other words, time interval between the pulse signals P1, P2 which are inputted into the ECU 12 is counted at an internal counter, and the door speed is calculated on the basis of the time interval of the counted counters when the slide door D moves a predetermined distance.

The opening and closing switch 13 includes three position switches including an off position, open position, and closed position, which are arranged so that the off position is sandwiched by the open position and the closed position. The opening and closing switch 13 provides a switch input (i.e., command for opening operation) for opening the slide door D from the completely closed position to the completely open position to the ECU 12 when the opening and closing switch 13 is operated from the off position to the open position. When the opening and closing switch 13 is operated from the off position to the closed position, the operational command for closing the slide door D from the completely open position to the completely closed position is provided to the ECU 12.

A state of the courtesy switch 14 assumes OFF when the slide door D is completely closed, and a state of the courtesy switch 14 assumes ON when the slide door D is not completely closed. The courtesy switch 14 provides the switch input into the ECU 12. A battery voltage detection sensor 23 detects battery voltage to provide it to the ECU 12.

The ECU 12 controls the drive unit 11 to automatically open the slide door D from the completely closed position to the completely open position when the opening and closing switch 13 is operated from the OFF position to the closed position. When the opening and closing switch 13 is operated from the OFF position to the open position, the ECU 12 controls the drive unit 11 to automatically close the slide door D from the completely open position to the completely closed position.

As shown in FIG. 2, the ECU 12 includes a PWM drive circuit 25 for actuating the motor 15 by changing width of duty ratio of ON/OFF relative to the motor 15 and a microcomputer 24 (i.e., serving as a speed difference calculation means, a speed difference memory means, an accumulation means, and pinch detection means). According to the embodiment of the present invention, the microcomputer 24 detects the position of the slide door D based on the pulse signals from the Hall elements 21, 22 and detects the operational speed and the moving direction of the slide door D. The microcomputer 24 carries out a prememorized program to automatically open and close the slide door D by controlling the motor 15 based on each output from the opening and closing switch 13, the courtesy switch 14, the Hall elements 21, 22, and the battery voltage detection sensor 23.

The microcomputer 24 determines PWM duty command signal SC considering the battery voltage detected by the battery voltage detection sensor 23. The microcomputer 24 outputs the PWM duty command signal SC to the PWM drive circuit 25.

The PWM drive circuit 25 outputs PWM drive signal SD of the duty ratio and the rotational direction commanded by the PWM duty command signal SC to the motor 15 in order to rotate the motor 15 in the normal or reverse directions.

According to the embodiment of the present invention, target speed of the motor 15 is predetermined relative to each door position within the operation range of the slide door D. Thus, by determining the target speed of the slide door D relatively low near the completely open position and the completely closed position, pinch force (i.e., load generated between the slide door D and the vehicle body V0) by the opening and closing operation of the slide door D can be reduced, high-grade image of the operation of the slide door D is created, and the safety of the slide door D operation is increased.

Figure 3:
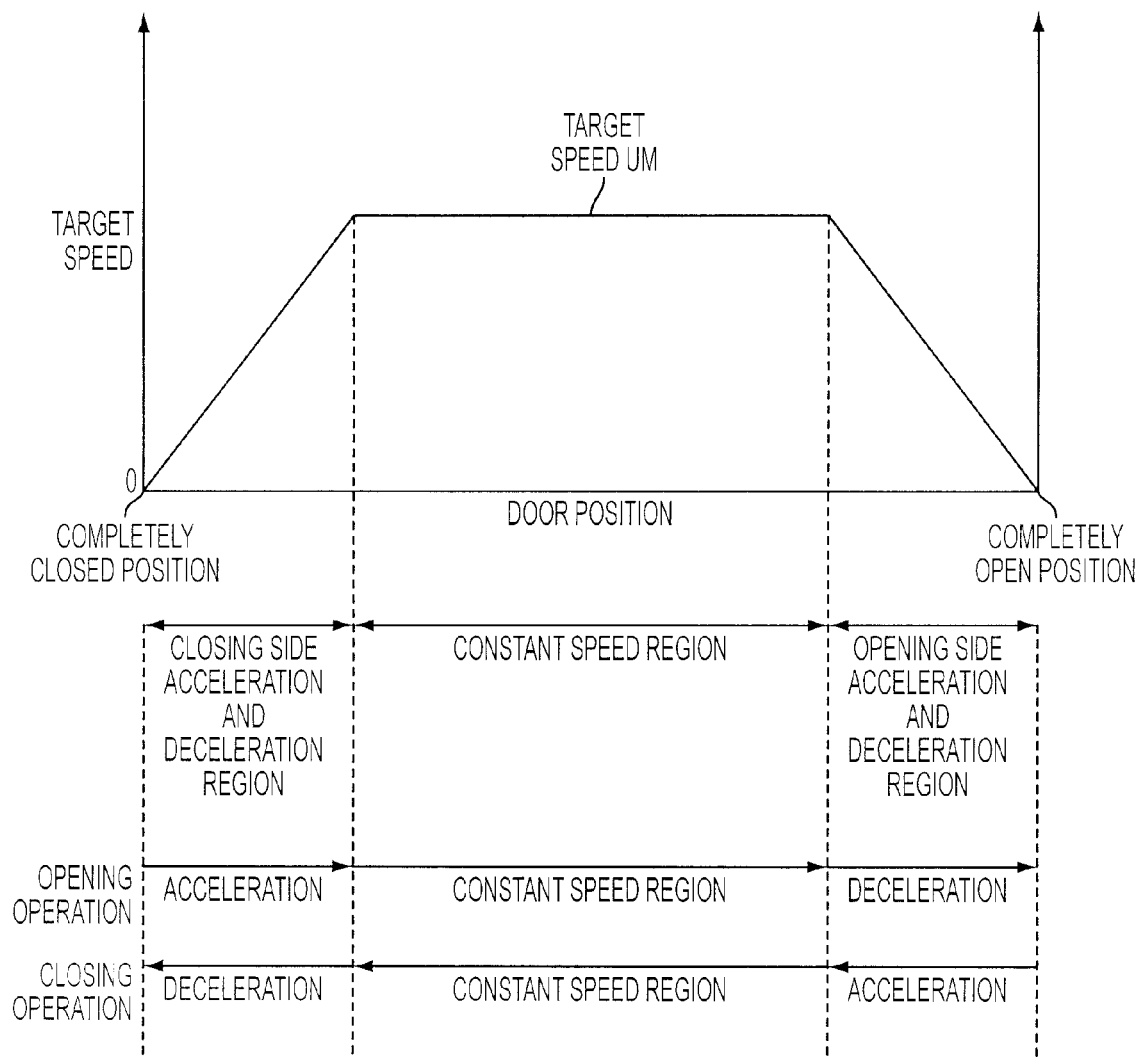
FIG. 3 is a graph showing a target speed at positions of a moving slide door shown in FIG. 1 according to the embodiment of the present invention.

Target speed within the operation range of the slide door D will be explained as follows. The operation range of the slide door D is divided into three sections, that is, the operation range of the slide door D is divided into a closing side acceleration and deceleration region including the completely closed position, an opening side acceleration and deceleration region including the completely open position, and a constant speed region between the opening side acceleration and deceleration region and the closing side acceleration and deceleration region as shown in FIG. 3.

The closing side acceleration and deceleration region is an operational region that the slide door D is operated to move outward from the completely closed position relative to the side of the vehicle and to the rear of the vehicle by a predetermined distance in the opening direction. The opening side acceleration and deceleration region is an operational region that the slide door D is moved forward of the vehicle from the completely open position to a predetermined forward position by a predetermined distance.

In the foregoing sections, target speed UM is determined as the following in accordance with the position of the slide door D. In the closing side acceleration and deceleration region, the target speed UM is determined to be close to zero at the completely closed position and to proportionally (e.g., linearly) increase from the completely closed position to a boundary with the constant speed region to reach maximum door speed. In the constant speed region, constant target speed UM in which speed of the slide door D assumes the maximum is determined. Further, in the opening side acceleration and deceleration region, the target speed UM is determined to proportionally (e.g., linearly) decrease from the boundary with the constant speed region to the completely open position so that the door speed assumes zero or close to zero until the slide door D reaches the completely closed position.

A program transaction performed by the ECU 12 in order to operate the slide door D will be explained referring to FIG. 4.

Because objects are likely pinched (i.e., entrapped to be squeezed) in accordance with the operation of the slide door D, particularly, when the door speed is decelerated at the closing side acceleration and deceleration region during the closing operation, the explanations mainly put emphasis on a control at the deceleration in the closing side acceleration and deceleration region during the closing operation.

Upon supply of the power to the ECU 12 from the battery, the microcomputer 24 starts the operation. Then, the operation shown in a flowchart of FIG. 4 is carried out.

In the program transaction, first, an initial transaction is carried out at Step S1. In the initial transaction, memories such as ROM for memorizing a program in the microcomputer 24 and RAM for tentatively memorizing information necessary for a control of the slide door D are checked, an internal timer is checked, and whether an actuation system for operating the slide door D normally operates is checked. Thereafter, an input transaction is performed at Step S2. In the input transaction of Step S2, states of the opening and closing switch 13, the courtesy switch 14, and the detection sensor 23 inputted into the microcomputer 24 is inputted to memorize switch states and sensor signals in a predetermined memory region in RAM. In this case, the pulse signals obtained from the Hall elements 21, 22 are binarized and inputted to be memorized in the predetermined memory region. At Step S3, the door actuation transaction is conducted on the basis of the operational state of the opening and closing switch 13. In this case, for example, when the opening and closing switch 13 is operated from the OFF position to the open position, the microcomputer 24 outputs the PWM drive signal to rotate the motor 15 in the normal direction, and thus to operate the slide door D in the opening direction. Likewise, when the opening and closing switch 13 is operated from the OFF position to the closed position, the microcomputer 24 outputs the PWM drive signal to vary the duty ratio to rotate the motor 15 in the reverse direction, and thus to operate the slide door D in the closing direction.

Thereafter, the program is advanced to Step S4 to conduct door speed calculation transaction at Step S4. In the door speed calculation transaction, values of a timer when the rising edges and falling edges of the pulse signals are inputted are memorized on the basis of the pulse signals inputted from the Hall elements 21, 22. Door moving speed when the slide door D moves is calculated on the basis of time interval τn between the rising edge and the consecutively inputted periodic falling edge (e.g., difference of timer values between edges) using obtained timer values of the internal timer. In this case, moving direction of the slide door D may be obtained by the pulse signals from the Hall elements 21, 22.

Figure 5:
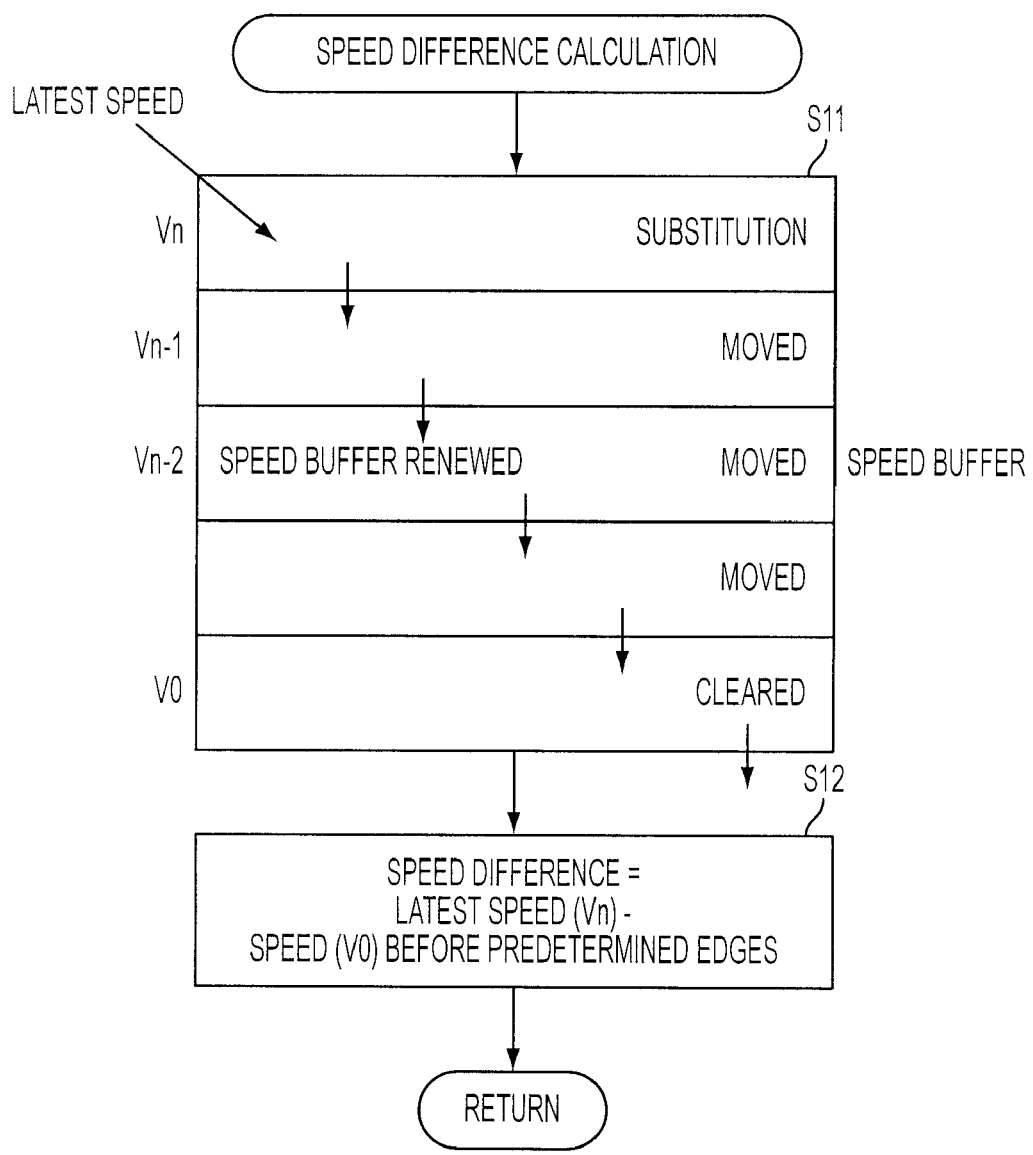
FIG. 5 is a flowchart showing a transaction of speed difference calculation shown in FIG. 4 according to the embodiment of the present invention.
Figure 8:
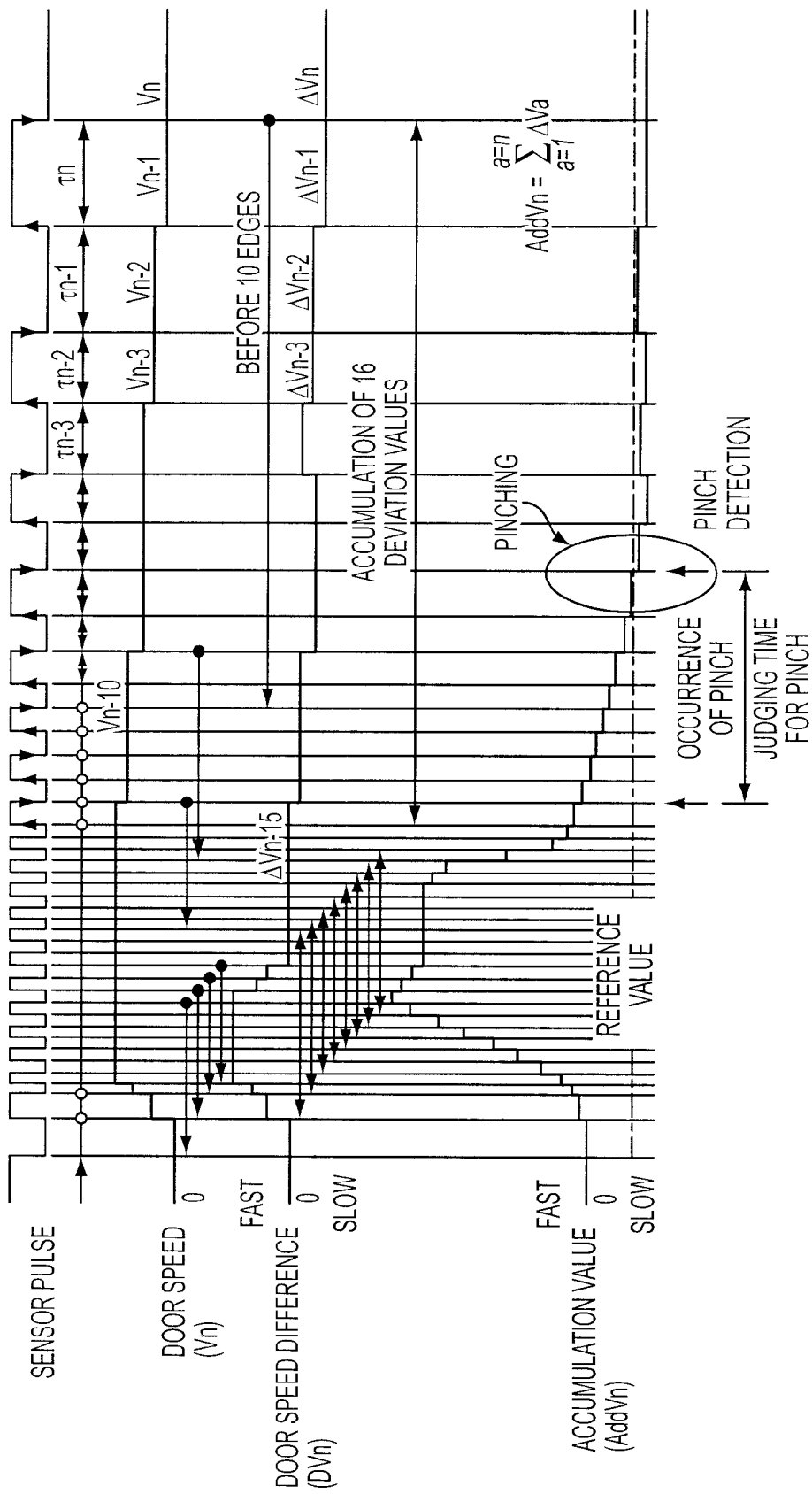
FIG. 8 is a graph showing relationships among pulse signals of Hall elements shown in FIG. 2, operation speed of the slide door, door speed difference, and an accumulation value in time sequence.

When the door moving speed of the slide door D is obtained from the door speed calculation transaction of Step S4, the speed difference calculation transaction is conducted on the basis of the calculated door speed at Step S5. In the speed difference calculation, difference between the most updated door speed (latest speed) obtained by the calculation and door speed at predetermined numbers of edges before (e.g., difference from the door speed ten edges before). As shown in FIG. 8, for example, difference between the latest speed Vn serving as a reference and door speed Vn-10 at ten edges before is calculated and memorized as door speed difference ΔVn in the predetermined memory region. Zero is substituted for the memory region at the initial transaction, and sequential values of the door speed difference ΔVn are renewed and memorized on the memory in order. The seed difference calculation transaction is shown in FIG. 5. In order to conduct the speed difference calculation transaction, more particularly, consecutively arranged n pieces of speed buffer memories (i.e., speed buffer with n bite) is ensured as a speed buffer in RAM. At Step S11, the latest speed Vn of the slide door D first substitutes Vn of the speed buffer, and the value is substituted in the manner from the speed buffer Vn, Vn-1, Vn-2 . . . V0 in sequential order. Further, the oldest value is cleared every predetermined time so that the memory is shifted sequentially to renew the memories. Thereafter, based on the door speed memorized in the speed buffer, the speed difference is calculated subtracting the speed at a predetermined numbers of edges before serving as speed at predetermined timing before (e.g., door speed at ten edges before) from the latest speed Vn (shown in FIG. 8).

Figure 6:
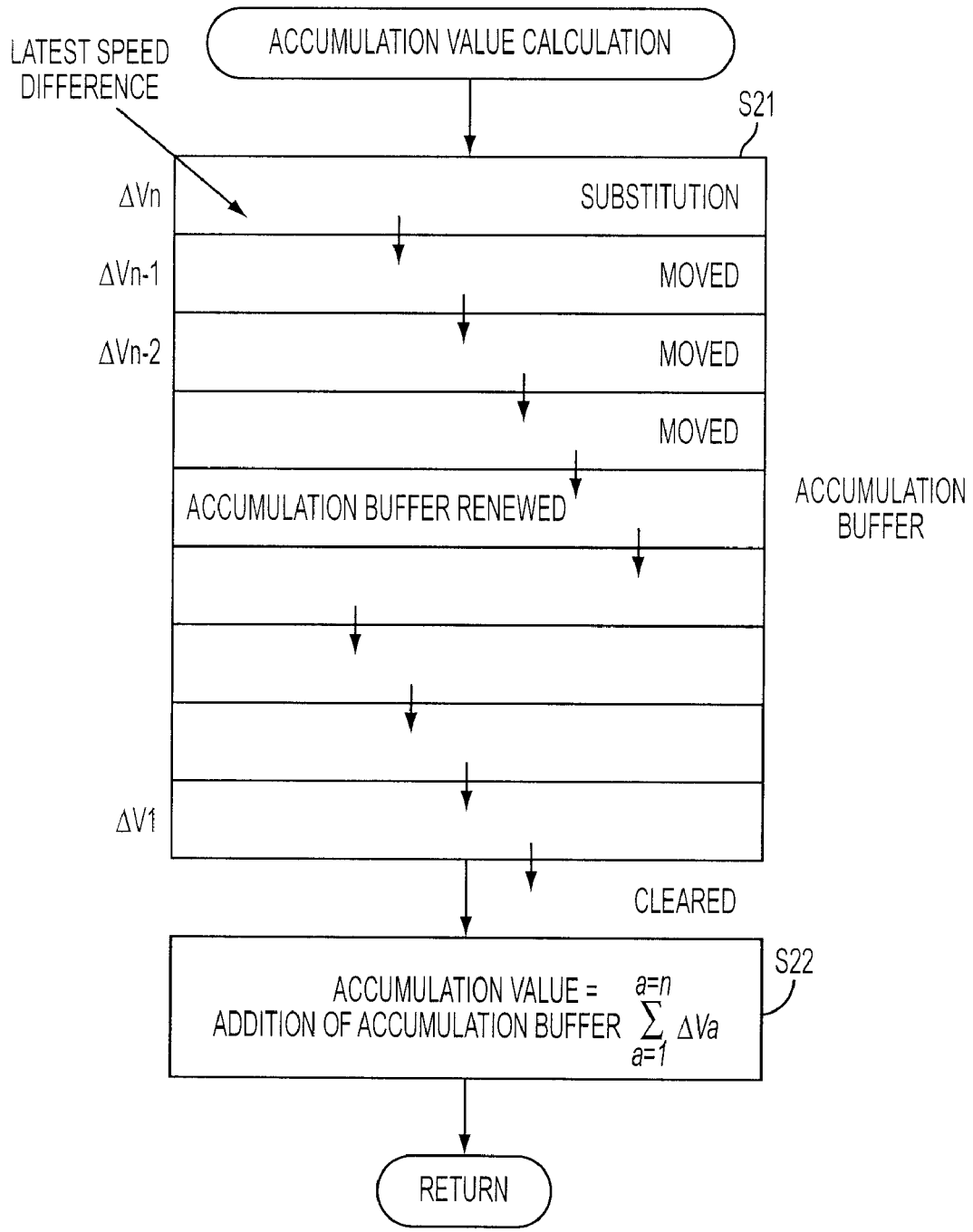
FIG. 6 is a flowchart showing a transaction of accumulation value shown in FIG. 4 according to the embodiment of the present invention.

When the speed difference calculation transaction is completed at Step S5, an accumulation value calculation transaction is conducted at Step S6. As shown in FIG. 6, in the accumulation value calculation transaction, gradual speed change of the slide door D is accumulated by integrating predetermined number of the speed differences ΔV (i.e., according to the embodiment of the present invention, because discrete value is treated, "integration" corresponds to the sum total) as shown in FIG. 9. When the moving speed of the slide door D is changed momentarily, as shown in 9A, the accumulation value is increased only for an instant moment and the accumulation value assumes smaller. However, when the object is pinched during the operation of the slide door D and the moving speed of the slide door D is changed slowly, as shown in FIGS. 9B-9C, the accumulation value of the door speed difference is calculated to be gradually accumulated. In other words, as shown in Step S21, the buffer memory is positioned in RAM and the speed difference ΔV is positioned in a predetermined region of RAM as a consecutive accumulation buffer ΔVn, ΔV-1, ΔV-2, . . . , and ΔV1. Likewise the speed buffer, the latest speed difference, first substitutes ΔVn of the accumulation buffer at Step S21. Thereafter, the speed difference substitutes from ΔVn of the accumulation buffer, ΔVn-1, ΔVn-2, . . . ΔV1 in order, and the oldest value of the speed difference is cleared to repeat a memory shift every predetermined time (e.g., 4 ms; period of main routine as shown in FIG. 4) and thus to renew memories. Thereafter, at Step S22, values of the speed difference ΔVn, ΔV-1, ΔV-2, . . . , and ΔV1 memorized in the accumulation buffer is added by a predetermined numbers n (e.g., experimentally n is determined as 16 in the embodiment of the present invention), and the accumulation value thereof is calculated by means of Step S22 and a formula shown in FIG. 8.

Figure 9A:
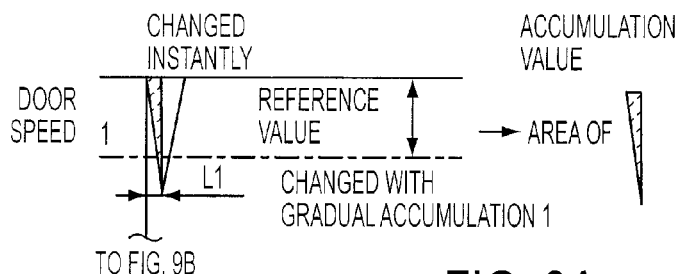
FIG. 9A is an explanatory view showing how the accumulation value of the speed difference changes when the slide door shown in FIG. 1 pinches a hard object.
Figure 9A:
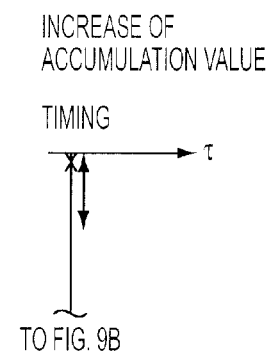
Figure 9B:
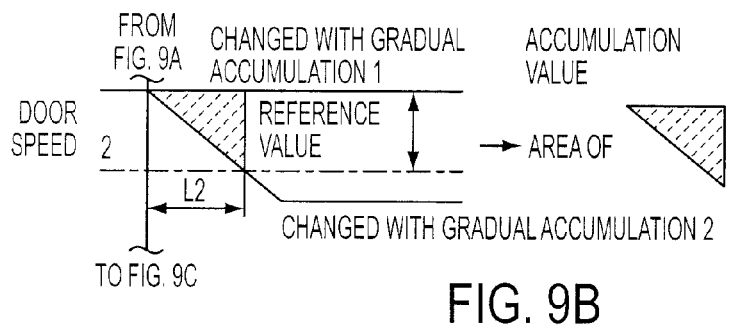
FIG. 9B is an explanatory view showing how the accumulation value of the speed difference changes when the slide door shown in FIG. 1 pinches an object softer than the object pinched in FIG. 9A.
Figure 9B:
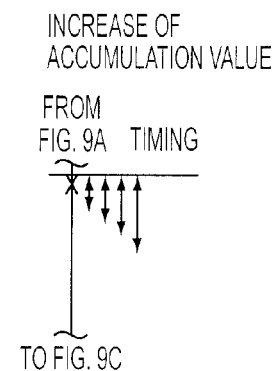
Figure 9C:
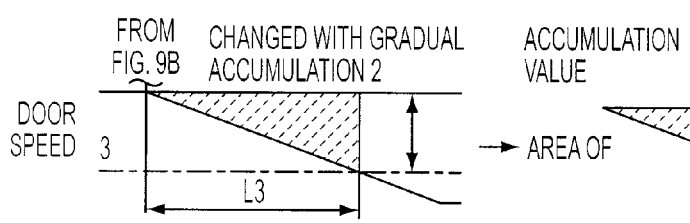
FIG. 9C is an explanatory view showing how the accumulation value of the speed difference changes when the slide door shown in FIG. 1 pinches an object softer than the object pinched in FIG. 9B.
Figure 9C:
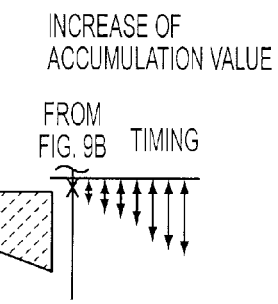

Further explaining the accumulation value with reference to FIG. 9, for example, when an object which does not have elasticity is pinched at the opening E between the slide door D and the vehicle body V0 in the case that the slide door D is operated in the closing direction, as shown in FIG. 9A, the door speed (i.e., speed 1) is momentarily declined. In this case, by providing a reference value (shown with one dotted chain line of FIG. 9A) for judging that the object is pinched relative to the door speed, it is judged that the object is pinched when the door speed is declined to be lower than the reference value. Then, the microcomputer 24 immediately stops the operation of the slide door D in the closing direction by the anti-pinch transaction. Otherwise, by outputting the PWM drive signal to the motor 15 in the reverse direction (i.e., opening direction) relative to the moving direction of the slide door D (i.e., closing direction) to drive the motor 15 in the reverse direction, the increase of the pinch force (i.e., load generated between the slide door D and the vehicle body V0) can be prevented.

FIG. 9B shows the case that an object softer than the object pinched in the case shown in FIG. 9A is pinched, and FIG. 9C shows the case that an object softer than the object pinched in the case shown in FIG. 9B is pinched. Comparing the cases shown in FIGS. 9B-9C, when the softer object is pinched, the door speed does not momentarily decline and rather gradually declines. In this case, the time that the door speed assumes below the reference value for judging incident of the pinch determined relative to the door speed assumes longer. Accordingly, with the construction of the embodiment of the present invention, accumulation of the energy from occurrence of incident of pinch can be judged by integrating predetermined number of door speed difference ΔV. That is, by judging whether the door speed difference is accumulated equal to or greater than a predetermined level while grasping the increase of the pinch force generated by the pinching by means of the microcomputer 24, pinching of the soft object can be detected.

In this case, calculating the accumulation values by formula shown in Step S22, the accumulation value shown in FIG. 9B assumes greater than the accumulation value shown in FIG. 9C. Accordingly, how much pinch force is affected at the opening E between the slide door D and the vehicle body V0 when the object is pinched depending on the greatness of the accumulation value is shown.

Figure 7:
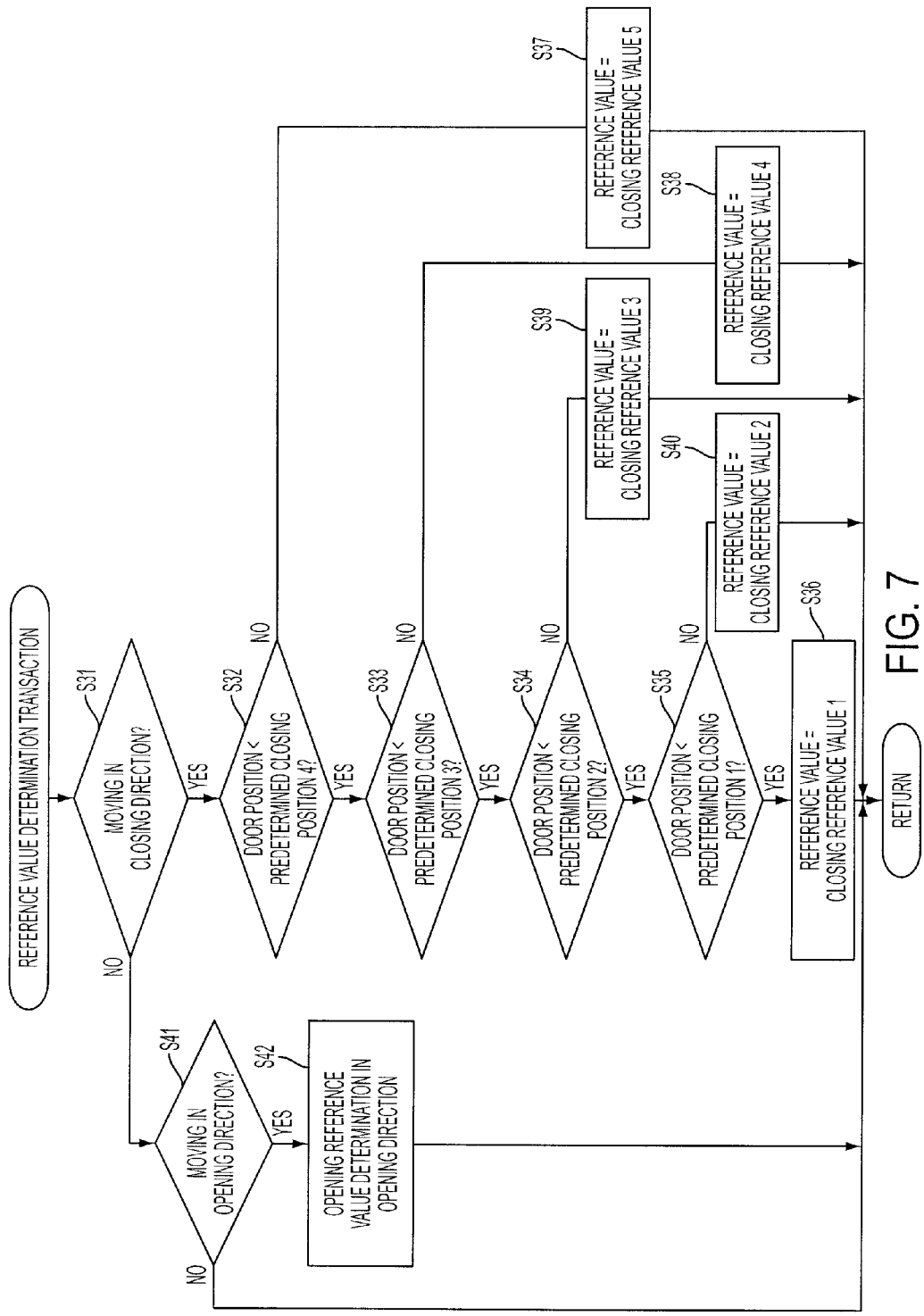
FIG. 7 is a flowchart showing a transaction of a slide door control by a microcomputer shown in FIG. 2 according to the embodiment of the present invention.
Figure 10:
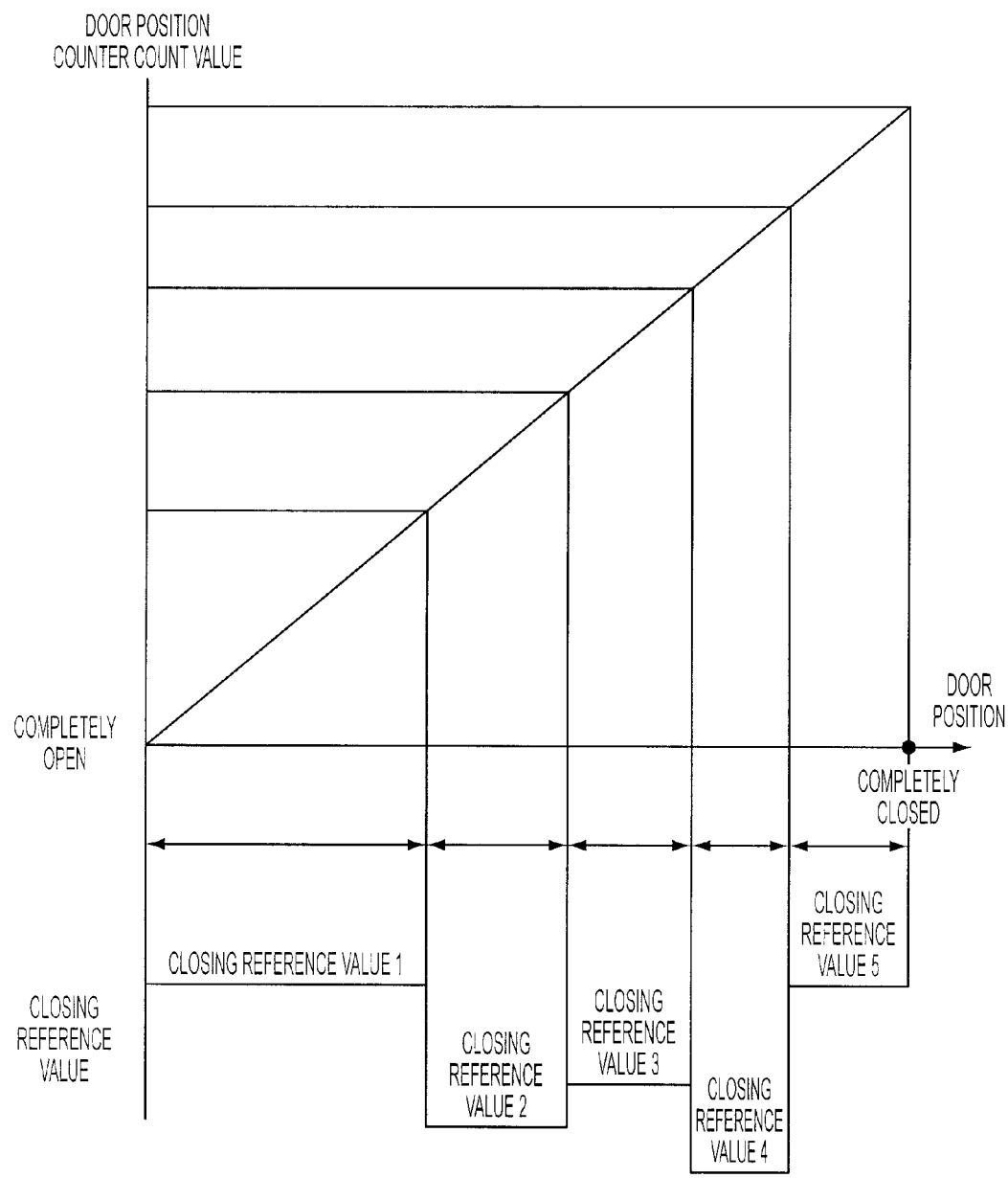
FIG. 10 is a graph showing relationships between count value of a door position counter and degree of closure reference values 1-5 corresponding to predetermined closing positions shown in FIG. 7 according to the embodiment of the present invention.

The microcomputer 24 transacts to determine the reference value serving as a reference when detecting the pinch (entrapment) of the object. A reference value determination transaction is shown in FIG. 7. With the reference value determination transaction, a predetermined closing position 1 (most closed side), a predetermined closing position 2, a predetermined closing position 3, and a predetermined closing position 4 (most open side) in order are determined from the completely closed position to the completely open position of the slide door D. Reference values 1-5 are set corresponding to a section between the completely closed position and the predetermined closing position 1, a section between the predetermined closing position 1 and the predetermined closing position 2, a section between the predetermined closing position 2 and the predetermined closing position 3, a section between the predetermined closing position 3 and the predetermined closing position 4, and a section between the predetermined closing position 4 and the completely open position respectively. Relationships among door position, door position counter, and reference values are shown in FIG. 10. Target speed of the slide door D is determined in accordance with the door position (shown in FIG. 3), and the microcomputer 24 outputs the PWM drive signal to the motor 15 so that the operation speed of the slide door D follows the target speed. For example, in case the slide door D is operated by means of the microcomputer 24, the reference values are determined on the basis of the experimental evaluation results considering an assembling state of the slide door D to the vehicle body V0 and the mechanical conditions such as sliding resistance when the slide door D moves along the guide rails V1-V3 provided on the lateral surface of the vehicle body V0. The reference values are determined to be negative values because the door speed declines when the occurrence of incident of the pinching is detected. The reference values at the opening side and at the closed side may be either the same or different.

The door position is calculated by means of the door position counter provided in the microcomputer 24 on the basis of the pulse signals from the Hall elements 21, 22 as explained as the followings. The door position of the slide door D determines the completely closed position as a reference position (i.e., zero point) in the door actuation transaction at Step S3. In this case, when the slide door D is actuated in the opening direction by rotating the motor 15 in the normal direction, the door position counter is incremented. On the other hand, when the slide door D is actuated in the closing direction by rotating the motor 15 in the reverse direction, the door position counter is decremented to obtain the latest door position every predetermined period in which the main routine is calculated.

In the reference value determination transaction shown in FIG. 7, whether the moving direction of the slide door D is in the closing direction is judged on the basis of the PWM drive signal to the motor 15 and a state of the opening and closing switch 13 at Step S31. In the case that the moving direction of the slide door D is in the closing direction, whether the current door position is at closing side relative to the predetermined closing position 4 (i.e., door position<predetermined closing position 4) is judged at Step S32. In case the door position is at opening side relative to the predetermined portion 4, a closing reference value 5 is determined as a reference value at Step S37 to complete the transaction. On the other hand, when the door position is at the closing side relative to the predetermined closing position 4, whether the door position is at closing side relative to the predetermined closing position 3 is judged at Step S33.

In the case the door position is at opening side relative to the predetermined closing position 3 at Step S33, a closing reference value 4 is determined as a reference value at Step S38 to complete the transaction. On the other hand, in the case the door position is at closing side relative to the predetermined closing position 3, the transaction is forwarded to Step S34.

Whether the door position is at closing side relative to the predetermined closing position 2 is judged at Step S34. When the door position is at opening side relative to the predetermined portion 2 at Step S34, a closing reference value 3 is determined as the reference value at Step S39 to complete the transaction. In the case the door position is at closing side relative to the reference position 2, the transaction is forwarded to Step S35. At Step S35, whether the door position is at opening side relative to the predetermined closing position 1 which is closest to the completely closed position is judged.

When the door position is at the opening side relative to the predetermined closing position 1 at Step S35, a closing reference value 1 is determined as the reference value at Step S40 to complete the transaction. On the other hand, in case the door position is at closing side relative to the predetermined closing position 1, the closing reference value 1 is determined as the reference value at Step S36.

In other words, the closing reference values 1-5 are determined in accordance with the door position including the section between the completely closed position and the predetermined closing position 1, the section between the predetermined closing position 1 and the predetermined closing position 2, the section between the predetermined closing position 2 and the predetermined closing position 3, the section between the predetermined closing position 3 and the predetermined closing position 4, and the section between the predetermined closing position 4 and the completely open position by the foregoing transactions S32-S40.

When the moving direction of the slide door D is not in the closing direction at Step S31, whether the moving direction of the slide door D is in the opening direction is judged at Step S41. In the case it is judged that the slide door D is operated in the opening direction at Step S41, an opening reference value in the opening direction is determined, with a method likewise the transactions S32-S40 at Step S42 to compete the reference value determination transaction. In case the opening and closing switch 13 is not operated at Step S41, the reference value determination in the opening direction and in the closing direction is not conducted, and the reference value determination transaction is completed to return to the main routine.

Figure 4:
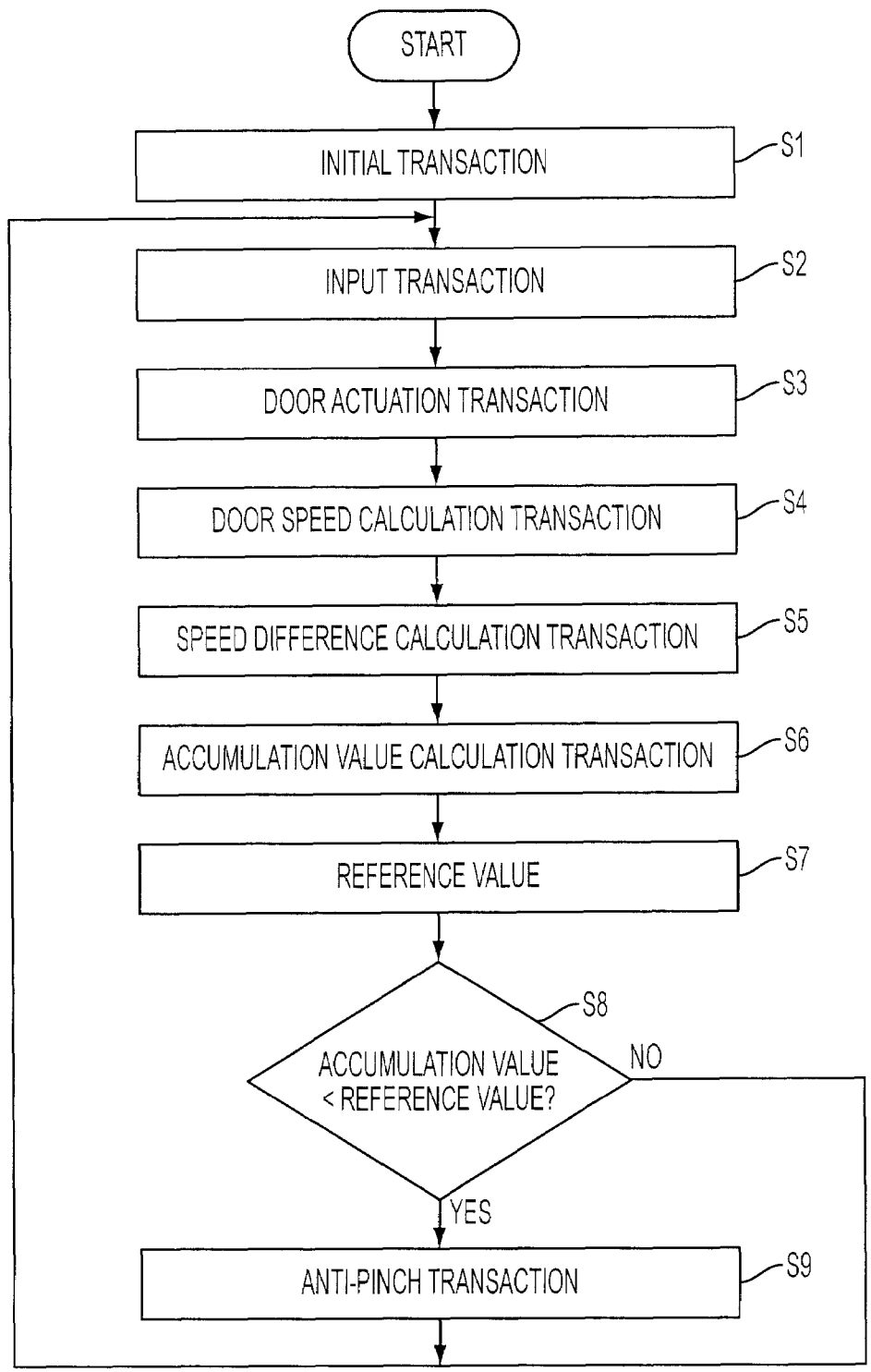
FIG. 4 is a flowchart showing a transaction for controlling slide door by a microcomputer shown in FIG. 2 according to the embodiment of the present invention.

When the reference value of the pinch detection is determined in accordance with the door position between the completely closed position and the completely open position at Step S7, the program is advanced to Step S8 (shown in FIG. 4). At Step S8, the accumulation value calculated at Step S6 and the reference value (i.e., the predetermined negative value) of the pinch detection determined at Step S7 are compared. In case the accumulation value does not assumes lower than the reference value, the microcomputer 24 judges that the pinching is not generated, and the transaction returns to Step S2. Thereafter, the transaction mentioned above is repeated every predetermined period. On the other hand, in case the accumulation value assumes lower than the reference value, the anti-pinch transaction is conducted at Step S9. In this case, the pinch (entrapment) is prevented by restraining the increase of the pinch force generated by the pinch by immediately stopping the rotation of the motor 15 or reversing the rotation of the motor 15 when the occurrence of incident of the pinch is detected.

Relationships among a sensor pulse serving as the pulse signals from the Hall elements 21, 22, the door speed, the door speed difference, and the accumulation value is shown in FIG. 8. As shown in FIG. 8, the door speed is obtained by measuring the time between the rising edge and the falling edge, the difference between the obtained speed and the speed at predetermined time before is obtained as the speed difference, and the occurrence of the incident of the pinch is judged when the accumulation value of the speed difference reaches a predetermined reference value. Accordingly, the pinching (entrapment) of the soft object during which the speed is gradually changed can be detected by comparing the accumulation value obtained by integrating the speed difference and the reference value. The pinch detection according to the embodiment of the present invention is unlikely influenced by something which momentarily generates the speed change such as the disturbance noise, and the detection time for the pinch detection can be shortened.

According to the embodiment of the present invention, the door speed is obtained by measuring the time between the rising edge and the falling edge, the difference between the obtained speed and the speed at predetermined edges before is obtained as the speed difference, and the occurrence of the pinch is judged when the accumulation value of the speed difference reaches the predetermined reference value. However, method for pinch detection is not limited. For example, the microcomputer 24 may judge the occurrence of pinching when accumulation value of difference between the latest duty ratio for driving the motor 15 and duty ratio at predetermined time before or predetermined timing reaches a predetermined reference value (i.e., reference value determined in accordance with the door position).

According to the embodiment of the present invention, the control means detects speed of the opening and closing body on the basis of the speed detection means to calculate the speed difference between the detected speed and the speed at predetermined time before. Thereafter, the control means memorizes predetermined number of the calculated speed differences, and calculates the accumulation value by integrating predetermined number of the memorized speed differences. In this case, when an object is pinched between the opening and closing body and the body in accordance with the movement of the opening and closing body, particularly, when the soft object is pinched, speed of the opening and closing body is not immediately restricted and is rather gradually declined. Thus, by memorizing the speed change in accordance with the movement of the opening and closing body as the speed difference and calculating the accumulation value by integrating predetermined number of the speed differences, the accumulation of the pinch force (i.e., load generated between the opening and closing body and the body) generated by the pinching can be detected. Accordingly, by determining the reference value for the occurrence of incident of the pinch relative to the accumulation value of the predetermined number of the speed differences and comparing the accumulation value and the reference value for occurrence of incident of pinch by the control means, the pinch detection of the opening and closing body can be conducted while restricting the increase of the pinch force. When it is detected that the object is pinched in accordance with the movement of the opening and closing body by the control means, the pinch force does not increase and the pinch detection can be securely conducted by conducting the anti-pinch transaction such as immediately stopping the movement of the opening and closing body or actuating the opening and closing body in the reverse direction when the occurrence of the pinch is detected.

According to the embodiment of the present invention, the reference value for the occurrence of pinch can be determined in accordance with the position of the opening and closing body even if the moving speed of the opening and closing body is changed in accordance with the position of the opening and closing body in a state that the pinch is not occurred. Accordingly, the reliability of the pinch detection can be improved.

According to the embodiment of the present invention, because the target speed is determined in accordance with the position of the opening and closing body between the completely closed position and the completely open position relative to the opening relative to the opening, the control means actuates the opening and closing body following the target speed determined in accordance with the position of the opening and closing body, and thus the accurate pinch detection can be conducted.

Although the opening and closing body control device according to the embodiment of the present invention is applied to the vehicle, the opening and closing body control device may be applied other types of structures. Also, although the opening and closing body control device according to the embodiment of the present invention is applied to the slide door, the opening and closing body control device may be applied to other parts of the vehicle such as a window regulator and a sunroof.

The principles, preferred embodiment and mode of operation of the present invention have been described in the foregoing specification. However, the invention which is intended to be protected is not to be construed as limited to the particular embodiment disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. An opening and closing body control device comprising:
    an actuation means for actuating an opening and closing body which opens and closes relative to an opening of a body;
    a speed detection means for detecting moving speed of the opening and closing body by the actuation means;
    a control means for driving the actuation means based on detected results from the speed detection means, the control means for conducting anti-pinch transaction for movement of the opening and closing body when an object is pinched between the opening and closing body and the body; wherein
    the control means includes
    a speed difference calculation means for calculating speed difference between latest speed and speed at predetermined time earlier of the opening and closing body on the basis of the detected results from the speed detection means;
    a speed difference memory means for memorizing predetermined number of the speed differences;
    an accumulation means for calculating accumulation value by accumulating predetermined number of speed differences; and
    a pinch detection means for conducting anti-pinch transaction of the opening and closing body by comparing the accumulation value and reference value for occurrence of pinch.

2. The opening and closing body control device according to claim 1, wherein the reference value for occurrence of pinch is determined in accordance with position of the opening and closing body.

3. The opening and closing body control device according to claim 2, wherein target speed of the opening and closing body is determined in accordance with the position of the opening and closing body between a completely closed state and a completely open state relative to the opening of the body.

4. The opening and closing body control device according to claim 1, wherein the speed detection means detects position, speed, and moving direction of the opening and closing body based on a period of a pulse signal.

5. The opening and closing body control device according to claim 4, wherein the speed detection means includes a Hall element.

6. The opening and closing body control device according to claim 1, wherein the opening and closing body includes any one of a slide door, a sunroof, and a window regulator.

* * * * *